United States Patent
Perissinotto et al.

(10) Patent No.: US 8,814,734 B2
(45) Date of Patent: Aug. 26, 2014

(54) TENSIONING DEVICE WITH A DAMPING MEANS COMPRISING A MINIMUM CAPACITY

(75) Inventors: Renzo Perissinotto, Dachau (DE); Tobias Schmid, Bronnen (DE); Thomas Englbrecht, Anzing (DE); Ulrich Schelzig, Munich (DE)

(73) Assignee: Iwis Motorsysteme GmbH & Co., KG, Munich (DE)

( * ) Notice: Subject to any disclaimer, the term of this patent is extended or adjusted under 35 U.S.C. 154(b) by 409 days.

(21) Appl. No.: 13/299,250

(22) Filed: Nov. 17, 2011

(65) Prior Publication Data
US 2012/0135831 A1  May 31, 2012

(30) Foreign Application Priority Data
Nov. 29, 2010 (EP) .................................... 10015104

(51) Int. Cl.
*F16H 7/08* (2006.01)

(52) U.S. Cl.
CPC ...... *F16H 7/0836* (2013.01); *F16H 2007/0859* (2013.01); *F16H 2007/0806* (2013.01); *F16H 2007/0891* (2013.01); *F16H 2007/0812* (2013.01); *F16H 7/0848* (2013.01)
USPC ........................................................ 474/110

(58) Field of Classification Search
CPC ................ F16H 2007/0806; F16H 2007/0812; F16H 2007/0859; F16H 2007/0891; F16H 2007/0836; F16H 2007/0848
USPC .................. 474/100, 101, 109, 110, 111, 140
See application file for complete search history.

(56) References Cited

U.S. PATENT DOCUMENTS

2001/0003279 A1   6/2001  Brandl et al.
2005/0059517 A1*  3/2005  Poiret ........................... 474/110

FOREIGN PATENT DOCUMENTS

| DE | 3741860 A1  | 6/1989 |
| DE | 4015708 C1  | 7/1991 |
| DE | 4035823 C1  | 12/1991 |
| DE | 19631607 A1 | 2/1998 |
| EP | 1106789 A2  | 6/2001 |

* cited by examiner

*Primary Examiner* — Michael Mansen
*Assistant Examiner* — Robert T Reese
(74) *Attorney, Agent, or Firm* — Baker & Hostetler LLP

(57) ABSTRACT

A tensioning device for a flexible drive means, such as a chain or a belt, includes a housing, a tensioning piston movably arranged in the housing and provided with a hollow space, a pressure chamber for hydraulic fluid arranged between the housing and the tensioning piston, a vent opening arranged in the tensioning piston, and a damping means in flow communication with the vent opening and with the pressure chamber. A packing element is arranged in the hollow space of the tensioning piston and is at least a component of the damping means, such that the damping means comprises a capacity for hydraulic fluid which corresponds to at least 30% of the volume of the pressure chamber added in a 1 mm stroke of the tensioning piston in the extension direction. The device relates to a series of tensioning devices as well as a transmission and a series of transmissions.

15 Claims, 7 Drawing Sheets

US 8,814,734 B2

TENSIONING DEVICE WITH A DAMPING MEANS COMPRISING A MINIMUM CAPACITY

CROSS-REFERENCE TO RELATED APPLICATION

This application claims priority to foreign European Patent Application EP 10015104.2, filed on Nov. 29, 2010, the disclosure of which is incorporated herein by reference in its entirety.

FIELD OF THE INVENTION

The present invention relates to a tensioning device for a flexible drive means, such as a chain or a belt, with a housing, a tensioning piston movably arranged in the housing and provided with a hollow space, a pressure chamber for hydraulic fluid arranged between the housing and the tensioning piston, a vent opening arranged in the tensioning piston, and a damping means in flow communication on the one hand with the vent opening and on the other hand with the pressure chamber.

BACKGROUND

Such a tensioning device is known from DE 19631607 A1. The screw-in chain adjuster described in this citation comprises, according to one embodiment, a screw-in housing with an inserted tube in which a tubular piston is guided to be longitudinally movable. The tube is provided with a bottom in which a check valve is arranged. The tube and the piston define a chamber space for hydraulic liquid, in particular engine oil. A damping means is arranged at the front end of the piston. The damping means comprises a roller which is arranged coaxially with respect to the piston. In the region of the roller, the piston's interior is configured as a seat for the roller. The receiving wall and the surface area of the roller here define a leakage gap. The inner wall of the piston is provided with an annular groove axially adjacent to the piston bottom corresponding to a vent opening provided in the piston bottom. The leakage gap essentially influences damping. This means that another leakage gap is formed between the piston and the tube, which is, however, selected to be narrow enough to represent a negligible damping influence, and damping is essentially influenced by the leakage gap between the roller and the piston.

Such damping means inside the piston are rather an exception, as in most tensioning devices, in particular chain adjusters, damping is performed by means of a leakage gap between the piston and the housing or the housing tube, and a vent means in communication with a vent opening in the piston is provided inside the piston. One component of such vent means often is a packing element which in most cases has the shape of a mushroom. This packing element is pressed against the end side of the hollow space in the tensioning piston by means of a pressure spring arranged inside the pressure chamber. Depending on the design, air can only escape to the vent opening via a gap in the packing element. The packing element mainly also serves to reduce the volume of the pressure chamber, so that for filling it completely, e.g. when an internal combustion engine is started, only a small amount of oil is required for completely filling the pressure chamber.

Tensioning devices having such damping means are in most cases connected to the engine oil circuit and naturally exhibit certain leakage during operation, so that the lost amount of oil must be constantly refilled via the check valve. The amount of oil to be circulated here must also be taken into consideration when designing the oil pump and determining its flow rate.

SUMMARY OF THE INVENTION

It is therefore the object of the present invention to provide a tensioning device of the type mentioned in the beginning which can manage with a lower oil throughput in operation.

In a generic tensioning device, it is to this end provided to dispose a packing element in the hollow space of the tensioning piston which is at least a component of the damping means, such that the damping means comprises a capacity for hydraulic fluid which corresponds to at least 30% of the volume of the pressure chamber added in case of a 1 mm stroke of the tensioning piston in the extension direction.

In particular when employed in a timing drive of an internal combustion engine, such tensioning devices are subjected to high dynamic loads. Accordingly, the piston constantly performs rather small retraction and extension motions which require on the one hand damping by a throttled discharge of oil from the pressure chamber, and on the other hand quick refilling of oil into the pressure chamber. If a check valve is employed for refilling the pressure space, in such highly dynamic motions, the switching times of the check valve naturally also have to be taken into consideration. The embodiment of the tensioning device according to the invention now provides that at least a portion of the hydraulic fluid does no longer have to flow via the main incoming flow, e.g. a check valve, but that the damping means comprising the packing element itself provides a reservoir for the backflow of hydraulic fluid into the pressure chamber. This can be idealized such that the liquid level fluctuates, if possible, according to the rhythm of the extension and retraction motions of the tensioning piston in the damping means. The design is to be preferably such that at least in the usual operating states, a minimum of, or even no hydraulic fluid at all escapes via the vent opening, but that the hydraulic fluid rather correspondingly flows back and forth in the damping means. Essential advantages result from the damping means acting inside the tensioning piston using the packing element. The gap adjustment between the tensioning piston and the housing can be standardized because this gap does not play any role, or only plays a subordinate role, for damping. It should be sufficient for the invention that the damping means according to the invention has a proportion of more than 50% in the total damping of the tensioning piston inside the tensioning piston, preferably more than 80%, and more preferred more than 95%. So, an economically reasonable clearance fit is preferably employed between the tensioning piston and the housing, which, however, provides sufficient sealing with respect to the leaking flow. A further advantage is that with such a narrower fit, a shorter guide length between the tensioning piston and the housing can be used. An essential advantage of the invention can be seen in that the required hydraulic fluid volume is reduced as the amount of fluid required for damping is at least partially available within the tensioning device. This lower hydraulic fluid consumption also eliminates the problems in case of undersupply. Standardization of production sizes of the piston and the housing (in particular the piston's outside diameter and the housing's bore diameter) permits such standardized piston housings for more multifarious applications, as damping can then be essentially adjusted by using different packing elements.

The measures according to the invention are to be distinguished from mere venting means which are arranged inside the tensioning piston, whereas damping is still effected by the leakage gap adjustment between the piston and the housing. In the invention, venting and damping are preferably accomplished via one and the same means, that is the damping means. The damping means only includes those components which actively take part in or can take part in damping. If parts of the flow passage are in communication with the vent opening without being throttled, their volumes can no longer be attributed to the capacity of the damping means. In prior art, overpressure means disposed between the vent opening and the pressure space are also known. As these, however, usually have a valve which closes again when pressure in the pressure chamber is relieved, no hydraulic fluid can flow back into the pressure space from these chambers. Moreover, the space downstream of the valve is in flow communication with the vent opening without throttling.

In an advantageous embodiment, it can be provided that at least one throttle channel is formed, at least as a component of the damping means, between the tensioning piston and the packing element, and/or in the packing element, the throttle channel being in flow communication on the one hand with the pressure chamber and on the other hand with the vent opening. Throttling is then accomplished via a precisely adjusted or adjustable throttle channel. One possibility of manufacturing such a throttle channel is to use an injection molded packing element. If the throttle channel is completely arranged in the packing element, the inner side of the tensioning piston can also be configured to be standardized. However, it is also possible to have a multi-piece design of the packing element (e.g. two interconnected sleeves inserted one into the other between which the channel is embodied). Favorably, however, the throttle channel could be shaped into the outer surface area of the packing element, so that then, when it is inserted into the tensioning piston with an accurate fit, a closed channel profile is formed.

In a further advantageous embodiment, it can be provided that at least one storage chamber is formed, at least as a component of the damping means, between the tensioning piston and the packing element, and/or in the packing element, the chamber enlarging the cross-section of flow of the throttle channel at least in sections. The throttle channel normally continues downstream of the storage chamber, so that the storage chamber can be considered as a component of the damping means. This storage chamber, or these several storage chambers, provides sufficient volume for the hydraulic fluid even in case of sufficient damping via the throttle channel, so that the probability of loosing hydraulic fluid via the vent opening is also further reduced.

Moreover, the outer contour of the cross-section of the packing element can be adapted to the inner contour of the cross-section of the hollow space in the tensioning piston, be inserted in the latter with an essentially accurate fit, and with its circumference be in sealing contact with the side wall of the hollow space over a longitudinal area, such that, at least in a length region, largely only the cross-section of flow of the throttle channel is available as a cross-section of flow for the damping means. Thus, the flow of hydraulic fluid out of and into the damping means is exclusively accomplished via the throttle channel. Following this length region, the fit between the packing element and the tensioning piston can be less tight or even provided with a predetermined clearance; depending on what the adjustment of the damping means and the reaching of sufficient capacity require. Here, it must be also taken into consideration that, as soon as sufficient pressure has built up in the pressure chamber, the in most cases hollow packing element is also subjected to the hydraulic fluid pressure and is pressed to the inner wall of the tensioning piston essentially over its complete length. The sealing contact in said length region then mainly serves to maintain the function before pressure has built up in the pressure chamber to a sufficient extent.

The packing element can also be fixed inside the tensioning piston by disposing a pressure spring in the pressure space which acts in the axial direction of the tensioning piston and is on the one hand at least indirectly supported at the housing, and on the other hand at least indirectly supported at the packing element. By this, a certain pretension is transmitted to the tensioning piston by means of the spring with the packing element being in-between even if the pressure space is depressurized, and thus the packing element is also held in its position.

To obtain a minimum length, the packing element can have a sleeve-like design. By this, it is e.g. possible to dispose the pressure spring inside the packing element and simultaneously obtain sufficient length for providing the damping function.

Moreover, the packing element can comprise a mandrel-like extension inside which extends into the interior of the pressure spring to reduce the volume of the pressure space. This mandrel-like extension does not affect the functioning of the pressure spring, but it also reduces the volume inside the pressure spring, so that in particular the time required for initial filling of the pressure space with hydraulic fluid can be reduced to a minimum.

Another advantageous embodiment provides that the packing element comprises a head essentially closing the sleeve shape, the head being at least indirectly pressed against an end wall of the hollow space in the tensioning piston. It is thereby possible, like in already known packing elements which are also pressed against the end wall of the hollow space in the tensioning piston, to use suited embodiments beneficial to venting. These embodiments then normally follow the actual damping embodiment of the packing body. However, it is in principle also possible to include the head of the packing element into the damping function.

Preferably, the head of the packing element can provide, alone and/or in cooperation with the end wall of the hollow space, a fluid communication between the throttle channel and the vent opening. Air escaping through the throttle channel then flows into this fluid communication and can subsequently escape through the vent opening. This fluid communication normally serves to expand the air and subsequently forward it without throttling.

A particularly simple embodiment variant provides that the throttle channel extends helically between the tensioning piston and the packing element, and/or in the packing element. This provides a maximum length of the throttle channel with a reasonably given length of the packing element. Moreover, by conveniently selecting the pitch of the channel helix, damping adjustment can be effected. Packing elements otherwise having the same designs can then result in different damping properties when different helical pitches are used.

A simple variant provides that the fluid communication comprises a ring channel disposed between the end wall of the hollow space and the head of the packing element, and/or in the packing element. Such a ring channel takes care of an expansion of the air flowing out of the throttle channel and optionally of the hydraulic fluid flowing out.

Preferably, the vent opening can be designed as a central bore disposed in the tensioning piston head, and the fluid communication can comprise at least one discharge channel disposed between the end wall of the hollow space and the head of the packing element, and/or in the head of the packing element, which connects the ring channel with the central vent opening. By this, an elegant bridging between a throttle channel disposed at the circumference of the packing element and the central vent opening can be achieved.

The invention furthermore relates to a series of tensioning devices, comprising at least one first and at least one second tensioning device, the first and the second tensioning devices comprising a housing bore for receiving the tensioning piston and a tensioning piston with a standardized diameter of the same size, and the damping means of the at least one first tensioning device differs from the damping means of the at least one second tensioning device in its damping characteristic, where the different damping characteristics are obtained by means of packing elements of different dimensions or embodiments.

In the best case, such a series of tensioning devices can lead to the housing and the tensioning piston having correspondingly identical designs, while mainly another packing element is employed for the respectively desired damping characteristic. This can be done to such an extent that, except for the packing element, all other components of the first and the second tensioning device are identical. By this, a considerable amount of costs can be saved, although damping can be adjusted to what is expected from individually different applications. In particular when it is employed in timing chain drives of internal combustion engines, damping can be adjusted by exchanging the packing element. Such a measure constitutes a decisive advantage with the cost pressure common in this field. In addition, the packing element of this tensioning device exhibits the lower hydraulic losses to be expected from the construction according to the invention. Of course, the series can be continued as desired, so that even more than two tensioning devices of different damping can be contained in the series.

Moreover, the invention relates to a transmission with a flexible drive means, such as a chain or a belt, at least two gearwheels in active relation with the drive means, and a tensioning device. In a chain drive, the tensioning device presses onto a tensioning rail which is arranged to be pivoting and lies against the chain and in this manner tensions the chain between the gearwheels. In such a transmission, the supply with hydraulic fluid is easier compared to prior art.

The invention also relates to a series of transmissions, comprising at least one first transmission and at least one second transmission, the first transmission comprising a first tensioning device of a series of tensioning devices according to claim 13, and the second transmission comprising a second tensioning device of a series of tensioning devices.

Here, one can save costs by using standardized components. However, the advantages of the employed tensioning devices have a positive effect on the series of transmissions in operation, too.

BRIEF DESCRIPTION OF THE DRAWINGS

Below, the invention will be illustrated more in detail with reference to the drawings. In the drawings:

With reference to FIGS. 1 and 2, the principle on which the present invention is based will be briefly illustrated below.

DETAILED DESCRIPTION

Figure 1:
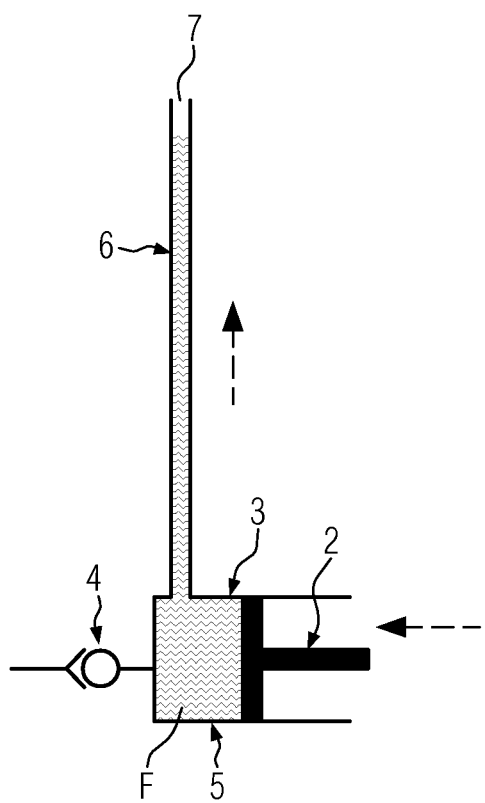
FIG. 1 shows a hydraulic schematic operating diagram for the extension procedure of the tensioning piston.

The tensioning device comprises a tensioning piston 2 which is guided in a bore (hollow space) of the housing 3 to be longitudinally movable. The adjustment of the gap between the tensioning piston 2 and the housing 3 is such that as little of the hydraulic fluid F as possible, or no hydraulic fluid F at all, can leak to the outside. Optionally, the use of a sliding seal (not represented) is also provided. The tensioning device is connected to a hydraulic fluid supply, and new hydraulic fluid flows in via a check valve 4 into the pressure chamber 5. Since the actual damping leakage gap 4 between the tensioning piston 2 and the housing 3 does not exist, a damping means 6 in fluid communication with the pressure chamber 5 is provided. The damping means 6 is in flow communication with a vent opening 7 at the flow end opposite the pressure chamber 5. The capacity of the damping means 6 is dimensioned such that it at least corresponds to the displaced volume of the tensioning piston 2 when the latter covers an extension path of a 1 mm stroke. The damping means 6 is designed such that hydraulic fluid can flow into the same in a throttled manner. In FIG. 1, a retraction motion of the tensioning piston 2 is represented. Due to the check valve 4, the outflow of hydraulic fluid F into the supply line is blocked, so that hydraulic fluid F essentially completely flows into the damping means 6.

Figure 2:
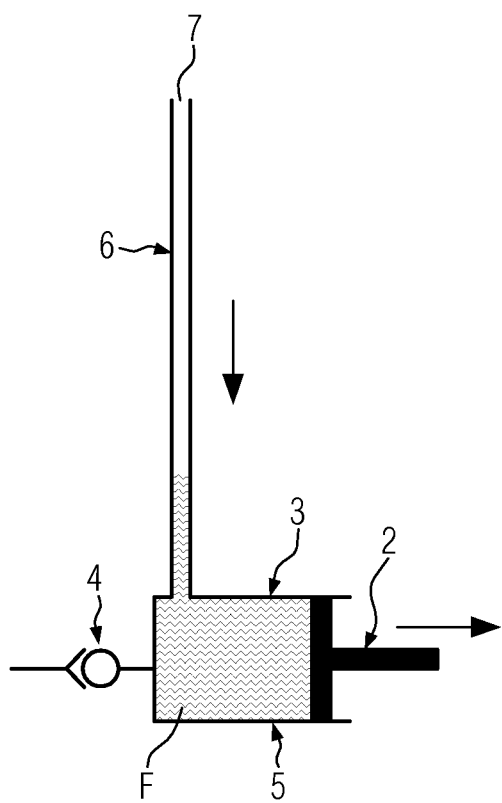
FIG. 2 shows a hydraulic schematic diagram for the retraction procedure of the tensioning piston.

FIG. 2 shows the reverse extension direction of the tensioning piston 2. By the suction effect, the check valve 4 opens and hydraulic fluid can follow. However, since the damping means 6 is directly in fluid communication with the pressure chamber 5 and has a rather considerable capacity, at least a portion of the hydraulic fluid F can also flow back from the damping means 6 into the pressure chamber 5. So, the damping means 6 provides a conduit of which the length and cross-section can be predetermined or adjusted and which takes on a damping and oil storing function. Furthermore, the capacity of the damping means 6 is preferably dimensioned such that in preferably many operating states, the level of the hydraulic fluid F in the damping means fluctuates, so that as little hydraulic fluid F as possible reaches the vent opening 7, and thus the operation of the tensioning device can be performed at a low throughput of hydraulic fluid.

Preferably, in this principle, damping is accordingly achieved by a very long conduit, different to the embodiment with a leakage gap between the tensioning piston 2 and the housing 3. It can also have a larger cross-section as the pressure losses required for adjusting damping are mainly generated by the length and the shape/geometry of the conduit. Thereby, a higher amount of hydraulic fluid is present in the conduit which thus functions as an intermediate storage. Thus, the a majority of the oil used for damping is not lost via the vent opening 7 but remains in the tensioning device.

According to FIG. 1, the force to be spent for pressing the hydraulic fluid into the damping means 6 has a damping function.

According to FIG. 2, by the extension of the tensioning piston 2, a vacuum is formed, so that hydraulic fluid is sucked in via the check valve 4 and the damping means 6.

Theoretically, by the ideal adjustment to a certain operating point, the required amount of hydraulic fluid can be sufficient just by the already existing oil volume of the pressure chamber 5 and the damping means 6. To minimize the suction volume of hydraulic fluid from the supply line, it is conceivable to throttle the inlet or lower the hydraulic fluid pressure.

The embodiment of the damping means 6 with the aid of a packing element arranged in the tensioning piston 2 is claimed.

A concrete inventive embodiment of the present invention will now be illustrated more in detail with reference to FIGS. 3 to 6. In each of FIGS. 3 and 5, the same chain tensioner 1 is represented as a tensioning device. In the present case, it is a screw-in chain adjuster which is screwed into a bore in the transmission case or in the engine block. The housing 3 of the chain adjuster 1 is made as a turn-milled component and comprises a screw-in hexagon head 8 with a locating flange 8.1. A ring seal 9 having a rectangular cross-section is arranged underneath the locating flange 8.1. Between the ring seal 9 and a screw-in region 10 provided with a thread, an annular groove 11 is formed via which hydraulic oil is supplied. For this, at a corresponding point in the transmission case or in the engine block, an oil supply bore is provided which ends in this annular groove 11. A radially extending connecting bore 12 connects the annular groove 11 with a pre-chamber 13 inside the housing 3. The housing 3 is provided with a receiving bore 15 open at its front side 14 for receiving the tensioning piston 2 to move it in the longitudinal direction. A seat for a check valve 4 is situated at the base of the receiving bore via which hydraulic oil can flow from the pre-chamber 13 into the pressure chamber 5 formed between the tensioning piston 2 and the housing 3.

The tensioning piston 2 as a hollow cylindrical component is provided with a press-on head 16 closed on one side except for a central vent opening 7. The vent opening 7 is in communication with the bore 17 inside the tensioning piston 2 (this will be discussed more in detail below). The tensioning piston 2 is only guided over a certain area within the receiving bore 15 with a narrow clearance fit, so that leakage through this gap is highly reduced compared to conventional chain adjusters which have a leakage gap at this point for damping purposes. Ideally, no more hydraulic oil should preferably flow out through this gap. For economical reasons, one will select a suited clearance fit which has an at least reasonable minimum of leakage. Inside the tensioning piston 2, a hollow cylindrical packing element 18 is disposed as a component of the damping means 6. The packing element 18 is provided with a head 19 having the shape of a spherical segment and comprises inside a coaxially extending, mandrel-like extension 20. Between the inner wall of the packing element 18 and the extension 20, an annular receiving space is thus formed. In the pressure chamber 5, a pressure spring 21 is moreover arranged next to the packing element 18. The one end of the pressure spring 21 is supported on the check valve 4 and thus on the base of the housing 3, while the other end is supported on the back of the head 19 at the packing element 18. By this, the pressure spring 21 is received over a large amount of its length in the annular receiving space between the extension 20 and the inner wall of the packing element 18. The pressure spring 21 keeps in position on the one hand the check valve 4 and on the other hand the packing element 18. However, a main job of the pressure spring 21 moreover is to apply minimum pretension by means of the chain adjuster while the pressure chamber 5 is still unpressurized.

The particularity of this chain tensioner 1 compared to conventional chain tensioners is, apart from the small gap between the tensioning piston 2 and the housing 3, the particularly shaped packing element 18. Packing elements 18 used up to now often had a mushroom shape and mainly fulfilled two purposes. On the one hand, they were used to reduce the pressure chamber volume, such that it can be filled with hydraulic oil more quickly, and on the other hand, throttled venting through the packing element head 19 was effected. The packing element 18 also takes on these functions in the present construction. In addition, it is embodied as a component of the damping means 6. For this, the packing element 18 comprises a helically surrounding throttle channel 22 formed in its surface area. In the present case, the throttle channel 22 has a rectangular cross-section; however, the cross-section and the course of the throttle channel 22 can be nearly arbitrarily selected to achieve a predetermined damping characteristic. The rear end of the packing element 18 is provided with a sealing region 23 closely lying against the inner wall of the bore 17, so that, in particular when the pressure chamber 5 is initially filled, the hydraulic fluid actually flows into this throttle channel 22. It is not absolutely necessary to provide the sealing region 23 over the complete length of the packing element 18 as by the pressure build-up in the pressure chamber 5, the packing element 18 expands and is closely pressed against the bore 17. Preferably, the packing element 18 is made of a plastic material. While the rear end of the throttle channel 22 ends in the pressure chamber 5, the front end of the throttle channel 22 ends in a ring channel 24 surrounding the head of the packing element 18. This ring channel 24 forms a larger cross-section of flow between the bore 17 of the tensioning piston 2 and the packing element 18, so that at this point, essentially no throttling takes place any longer, and the ring channel 24 cannot be attributed to the damping means. The ring channel 24 is in communication with the vent opening 7 via two discharge channels 25 worked into the spherical front surface of the head 19 in a crosswise manner.

The capacity of the throttle channel 22 corresponds to at least 30% of the volume in the pressure chamber 5 added by the tensioning piston 2 in a 1 mm extension stroke. This means that the volume amount added in a 1 mm extension stroke is relevant for the calculation of the minimum volume of the throttle channel 22.

Figure 3:
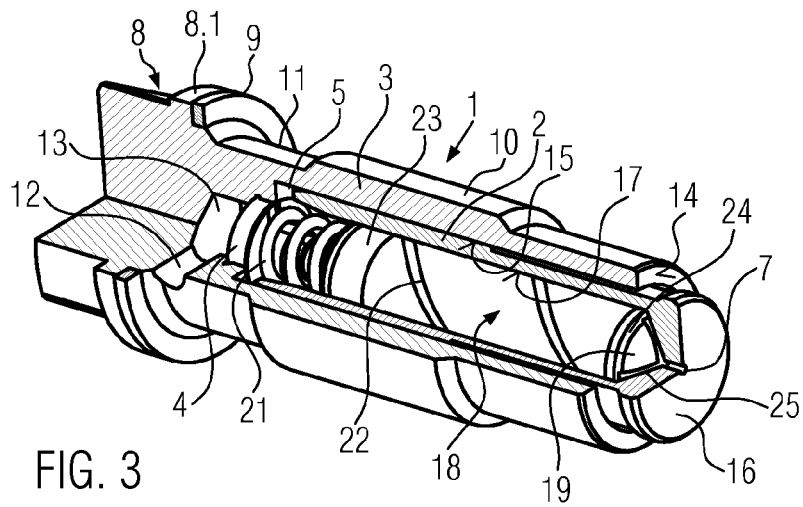
FIG. 3 shows a perspective representation of a screw-in chain tensioner according to the invention in a half section.
Figure 4:
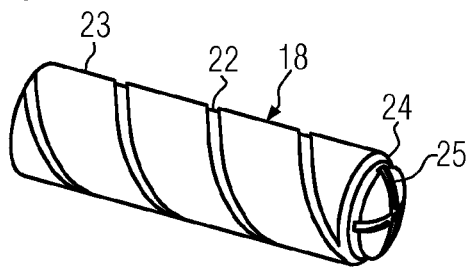
FIG. 4 shows a packing element to be employed in a chain tensioner according to FIG. 3.
Figure 5:
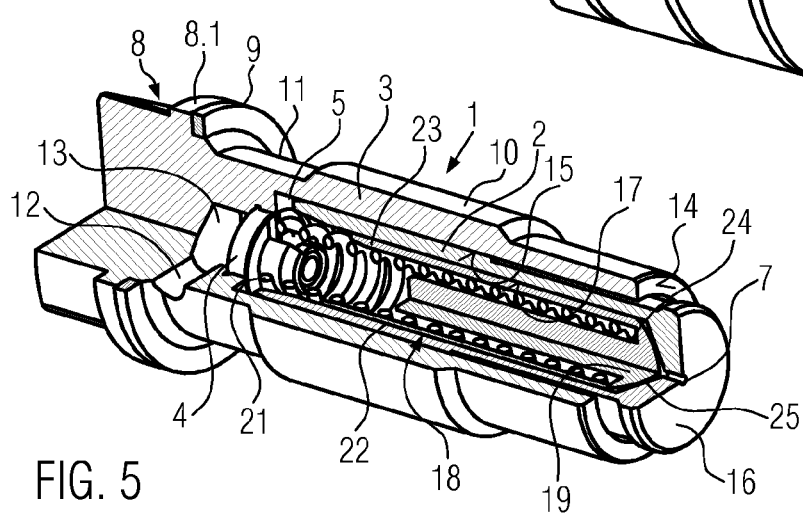
FIG. 5 shows the chain adjuster represented in FIG. 3 in a perspective half section, where the components disposed inside the tensioning piston are also represented in a section.
Figure 6:
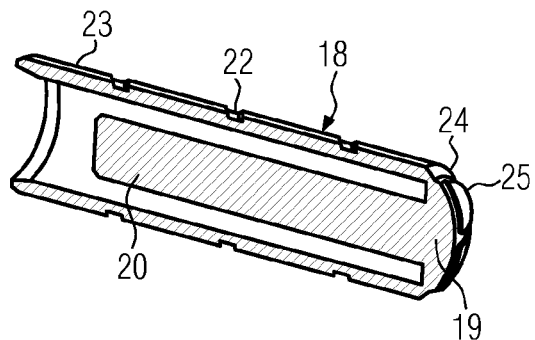
FIG. 6 shows a packing element to be employed in a chain tensioner according to FIG. 3 in a full section.

The packing element 18 represented in FIGS. 4 and 6 by way of example is not identical to the packing element inserted in FIGS. 3 and 5. It rather comprises a throttle channel 22 with a smaller pitch and thus more helixes between the beginning and the end. This packing element in FIGS. 4 and 6, however, can be without any problems inserted as an alternative to the packing element 18 of FIGS. 3 and 5 to obtain a different damping characteristic. By this, in the otherwise identical chain tensioner 1, a chain tensioner 1 having different damping characteristics can be created just by exchanging the packing element 18. Correspondingly, just by this exchange, different chain tensioners 1 with corresponding pertaining different damping characteristics can be manufactured within a series of chain tensioners. In the mass market existing in the motor vehicle field, this constitutes a considerable production advantage, as damping does not have to be adjusted by individually designing the leakage gap between the housing and the tensioning piston, as before.

The operation and function of the above-described embodiment can be very easily understood by means of the already illustrated schematic diagrams 1 and 2. The throttle channel 22 provides a certain storage volume for hydraulic oil, so that, when the tensioning piston is extended, hydraulic oil does not only flow into the pressure chamber 5 via the check valve 4 but is also sucked out from the throttle channel 22 into the pressure chamber 5. With a corresponding adjustment of the throttle channel 22, the hydraulic oil column always somewhat fluctuates in the throttle channel 22, in particular in the normal operating state. Due to this active principle, one can manage with a relatively low hydraulic oil throughput as losses (hydraulic oil flowing out via the vent opening 7) are kept within a limit. When the tensioning piston 2 is retracted, the check valve 4 closes and the throttle channel 22 between the packing element 18 and the tensioning piston 2 develops its damping effect, so that now a dampened retraction of the tensioning piston 2 is possible. When hydraulic supply is interrupted, hydraulic oil can possibly escape from the pressure chamber 5 and air can be contained in it. When hydraulic supply is started again, venting will take place by usual means with the aid of the packing element 18, the throttle channel 22, the ring channel 24, and the discharge channel 25 as well as the vent opening 7. For the throttle effect, the connection of the damping means 6 with this vent opening 7 is also an essential part.

Further embodiments of the present invention will be illustrated more in detail below with reference to some drawings.

FIGS. 7a to 7e show different courses of the throttle channel 22 by way of example. The representations are each a development of the surface area of the tensioning piston 2.

Figure 7A:
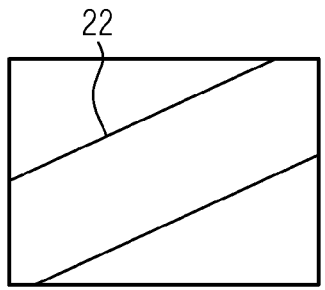
FIGS. 7a-7e show schematic developed views of the surface area of variants of the packing elements with a differently designed throttle channel or throttle channels, respectively.

In FIG. 7a, the already known helically surrounding shape of the throttle channel 22 is represented.

Figure 7D:
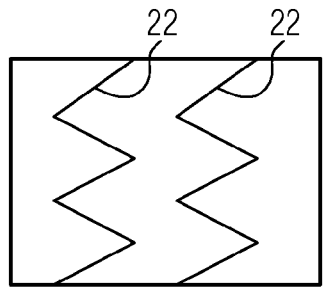
Figure 7B:
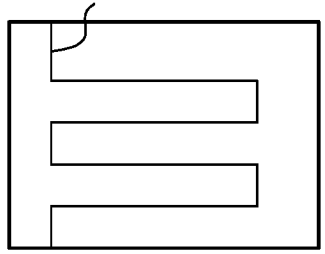

FIG. 7b shows a throttle channel 22 which, apart from sections extending parallel to the axis, also comprises sections only extending in the circumferential direction, quasi like a meander.

Figure 7E:
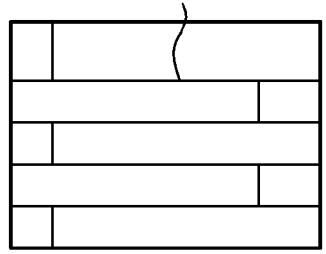
Figure 7C:
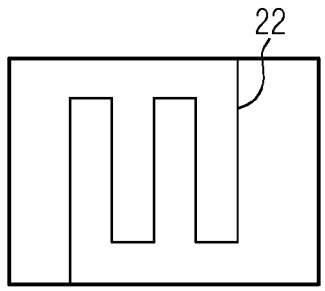

In FIG. 7c, a meander shape of the throttle channel 22 is represented again, here, however, mainly the sections of the meander extending in a direction parallel to the axis.

In FIG. 7d, two zigzag throttle channels 22 arranged one next to the other are provided.

In FIG. 7e, the throttle channel 22 is formed of four ring channels and connecting pieces interconnecting them and extending parallel to the axis. At the beginning and at the end, there then exists one connection piece each, on the one hand for the pressure chamber 13 and on the other hand for the ring channel 24.

Of course, other shapes can also be employed for achieving a better throttle effect. At this point, it should be additionally mentioned that such channel shapes can also be worked in inside the packing element. It is principally possible, though more complicated, to provide them also on the inner surface of the tensioning piston 2, where then the packing element 18 just closes the channels. The arrangement inside the packing element could be effected by a multi-piece embodiment of the packing element 18.

Figure 8A:
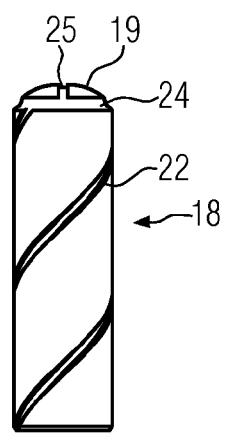
FIGS. 8a-8c show a packing element with different pitches of the helical throttle channel in a front view.
Figure 8B:
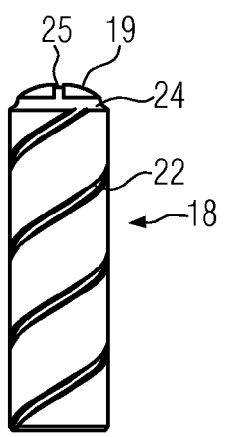
Figure 8C:
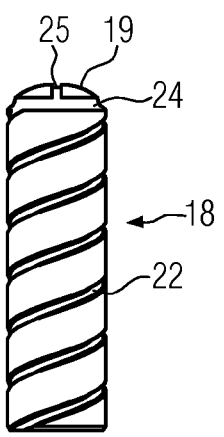

The embodiments according to FIGS. 8a to 8c each represent different packing elements with different damping characteristics, where in all embodiments one and the same principle of forming the throttle channel 22 is used. This is the already known helical shape, where, in each case starting from FIG. 8a, the throttle channel 22 is formed in the packing element 18 with an ever smaller pitch (FIGS. 8b and FIG. 8c), resulting in an ever greater capacity and longer throttle channel 22, while the cross-section of flow remains the same.

Figure 9:
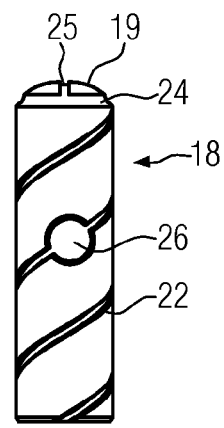
FIG. 9 shows a packing element with a storage chamber in a front view.

Apart from the design as a simple channel, it is also possible to provide additional hydraulic oil storages within the throttle path. In FIG. 9, such an example is now represented. Approximately in the middle of the length of the packing element 18, a circular oil chamber 26 is provided which has the same depth as the throttle channel 22 but functions as a kind of intermediate storage. Since the throttle channel 22 leads both to the oil chamber and away from it, there are no negative effects on the damping characteristic, but a corresponding capacity for hydraulic oil is created.

With reference to FIGS. 10a to 10e, now diverse embodiments of such oil chambers 26 are described more in detail by way of example. Here, the embodiments of the throttle channels 22 correspond to the embodiments of the throttle channels of FIGS. 7a to 7e.

Figure 10A:
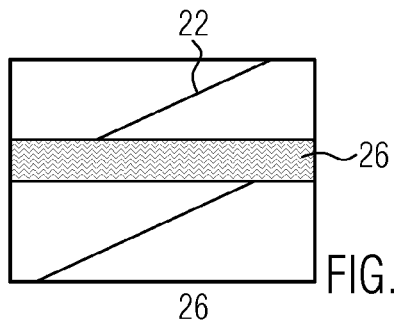
FIGS. 10a-10c show different variants of the surface area development of the packing element with differently designed throttle channels and storage chambers.

In FIG. 10a, approximately in the middle of the length of the packing element 18, an oil chamber 26 is shaped in the form of a surrounding annular groove which interrupts the otherwise helically surrounding throttle channel 22.

Figure 10D:
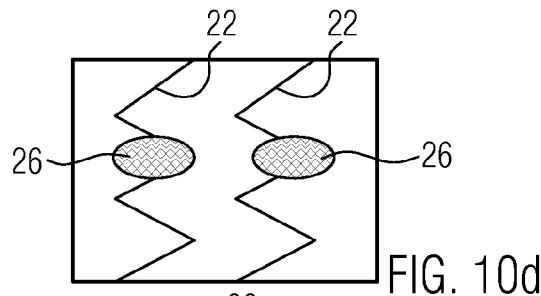
Figure 10B:
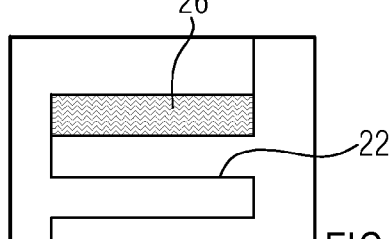

In FIG. 10b, a depression is formed in a circumferential region of the meander shape which, having the shape of a pan, receives oil.

Figure 10E:
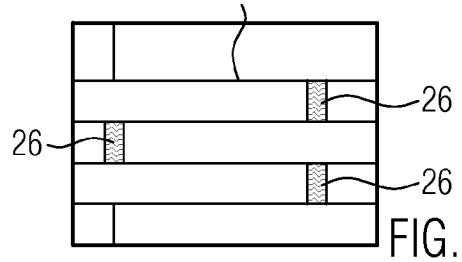
Figure 10C:
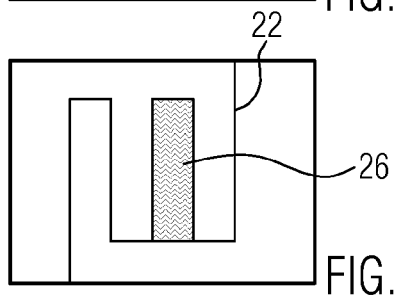

Similarly, but in a direction parallel to the axis, a corresponding oil chamber 26 having the shape of a pan can be seen in FIG. 10c.

According to FIG. 10d, an elliptically shaped oil chamber 26 is formed in each zigzag throttle channel 22.

In FIG. 10e, one can see a variant in which the connections between the ring channels parallel to the axis are embodied as small connecting oil chambers 26.

The above embodiments are also to be merely understood as examples. The embodiments can be multifarious. The oil chambers 26 do not necessarily have to have the same depths as the throttle channels 22, but often have the same depth.

The embodiment according to the invention including the packing element 18 for forming the damping means 6, offers numerous advantages for a chain tensioner 1. On the one hand, it has a low oil consumption, thus eliminating problems due to undersupply. Damping is adjusted by means of the packing element 18 and no longer by means of a leakage gap between the tensioning piston 2 and the housing 3. By this, production sizes for the piston 2 and the housing 3 can be standardized. In case of aluminum pistons, the packing element 18 prevents wear between the tensioning piston 2 and the pressure spring 21. The packing element 18 takes on the function which packing elements employed up to now already fulfilled in addition to the damping function. Furthermore, the guide length of the tensioning piston 2 in the housing 3 can be shortened as here no selective leakage is to occur anymore.

The consequence of standardization of production sizes for the tensioning piston 2 and the housing 3 is that series of chain tensioners can be created using this standardized production sizes for the piston and the housing. Here, the receiving bore 15 in the housing 3 and the corresponding diameter of the tensioning piston 2 are of particular importance. Only by exchanging packing elements 18.1, 18.2 of different dimensions and/or embodiments, chain tensioners 1.1 and 1.2 having different damping characteristics can be obtained within these series of tensioning devices (see FIGs. 11a-11b). The same naturally also applies to the complete transmission (FIG. 12) and the corresponding series of transmissions, so that in the most favorable case, just by exchanging one single component, that is the packing element 18, complete transmission series which require correspondingly different damping characteristics can be operated.

Figure 12:
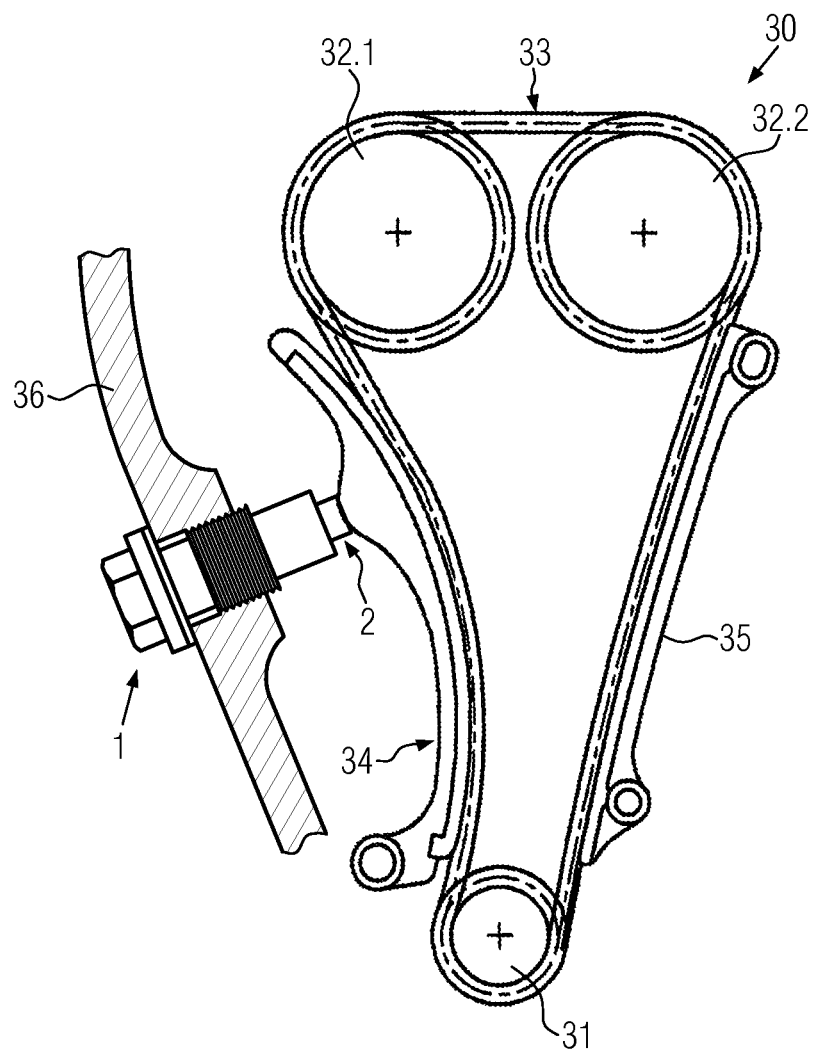
FIG. 12 is a schematic drawing of a transmission with a flexible drive means and FIG. 13 is a schematic drawing of a series of transmissions, comprising a first transmission and a second transmission.

According to FIG. 12 the transmission 30 includes a sprocket 31 connected to a crank shaft of an engine and two gears 32.1 and 32.2 connected to the cam shafts of this engine, respectively.

The transmission 30 further comprises a chain 33, engaging the sprockets 31, 32.1 and 32.2 as well as a tensioning rail 34 and a guide rail 35. The tensioning rail 34 is pivotally mounted and is pressed against the chain 33 by chain tensioner 1. Chain tensioner 1 is screwed into a part of the engine case 36. The piston 2 of the chain tensioner 1 rests on the tensioning rail 34 and pushes it against the chain 33. The chain tensioner 1 is identical for example, to the chain tensioner as shown in FIG. 3.

Figure 11A:
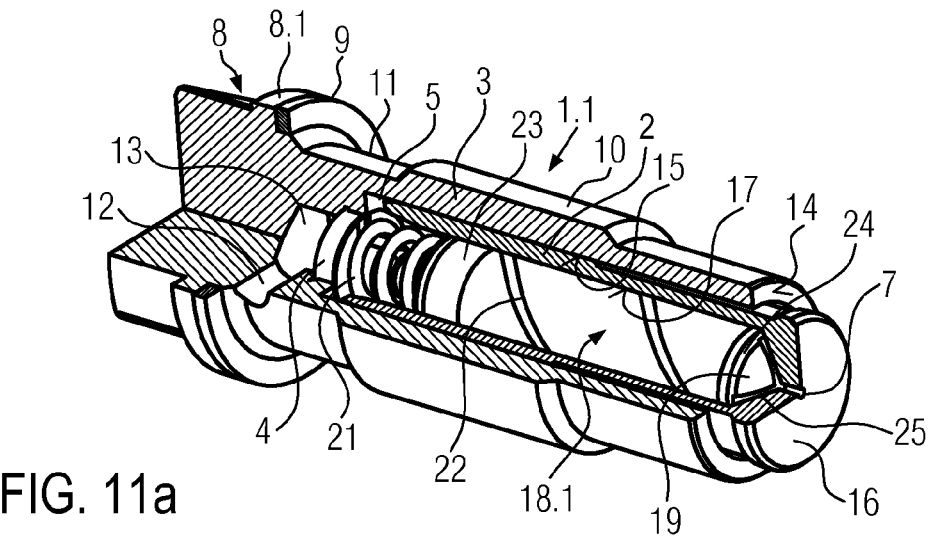
FIGS. 11a-11b show a perspective representation of a series of screw-in chain tensioner according to invention in a half section.
Figure 11B:
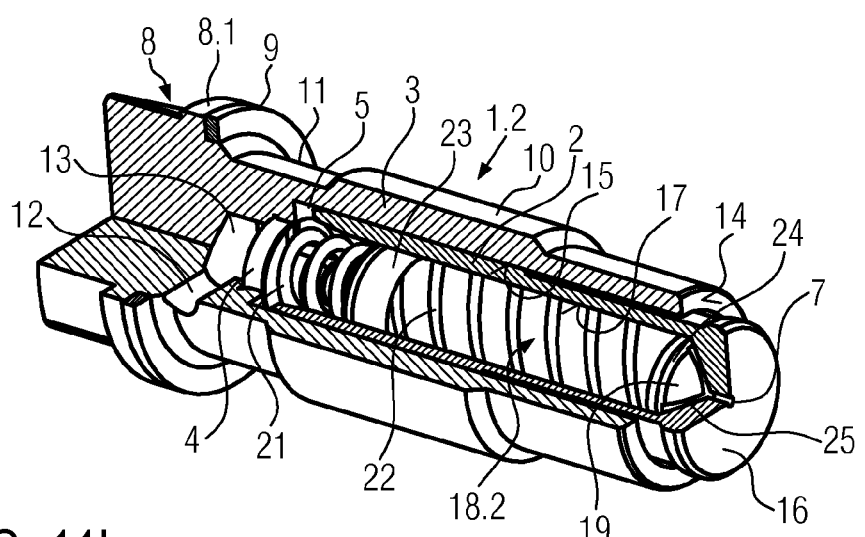
Figure 13:
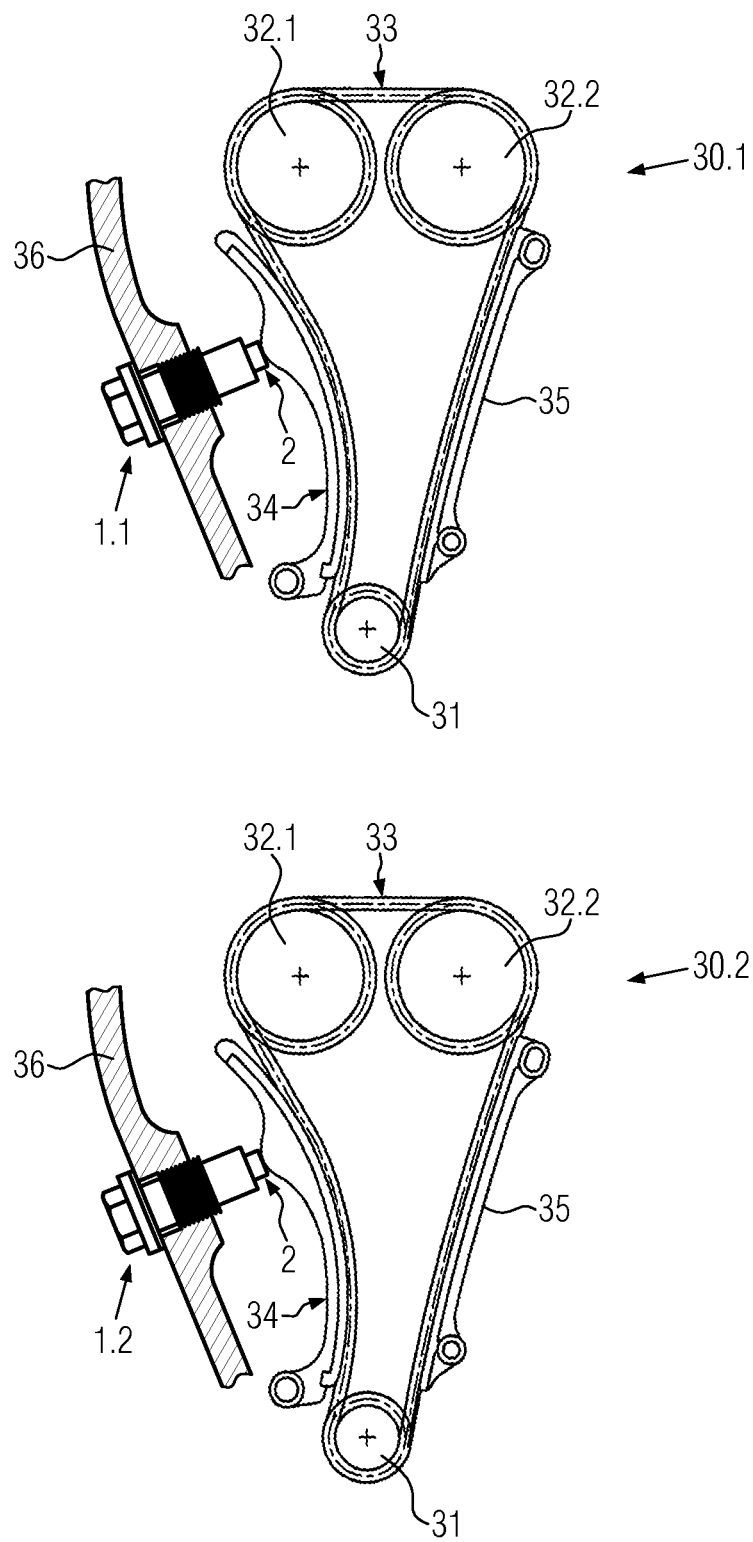

FIG. 13 shows a series of transmissions, including transmission 30.1 and 30.2. In this embodiment the only difference between these two transmission 30.1 and 30.2, is a distinct chain tensioner. The first transmission 30.1 uses chain tensioner 1.1 and the second transmission 30.2 uses chain tensioner 1.2. The respective chain tensioners 1.1 and 1.2 are shown in FIGS. 11a-11b which means that only the packing element 18 is of different design. In view of the embodiment shown in FIG. 13 it is not necessary that the transmission 30.1 and 30.2 are completely identical as long as chain tensioner 1.1 and 1.2 from a series similar as shown in FIGS. 11a-11b.

The invention claimed is:

1. A tensioning device for a flexible drive means, such as a chain or a belt, comprising:
    a housing,
    a tensioning piston movably arranged in the housing and provided with a hollow space,
    a pressure chamber for hydraulic fluid formed between the housing and the tensioning piston,
    a vent opening disposed in the tensioning piston,
    a damping means in flow communication on the one hand with the vent opening and on the other hand with the pressure chamber, and
    a packing element arranged in the hollow space of the tensioning piston which is at least a component of the damping means, such that the damping means comprises a capacity for hydraulic fluid which corresponds to at least 30% of the volume of the pressure chamber added with a 1 mm stroke of the tensioning piston in the extension direction.

2. The tensioning device according to claim 1, wherein, at least as a component of the damping means, at least one throttle channel is formed between the tensioning piston and the packing element, and/or in the packing element, the throttle channel being in flow communication on the one hand with the pressure chamber and on the other hand with the vent opening.

3. The tensioning device according to claim 2, wherein, at least as a component of the damping means, at least one storage chamber enlarging the cross-section of flow of the throttle channel at least in sections is formed between the tensioning piston and the packing element, and/or in the packing element.

4. The tensioning device according to claim 1, wherein the outer contour of the cross-section of the packing element is adapted to the inner contour of the cross-section of the hollow space in the tensioning piston, and is inserted into the latter essentially with an accurate fit, and is with its circumference in sealing contact with the side wall of the hollow space over a length region, such that at least in this length region largely only the cross-section of flow of the throttle channel is available as a cross-section of flow for the damping means.

5. The tensioning device according to claim 1, wherein a pressure spring acting in the axial direction of the tensioning piston is arranged in the pressure space which is supported on the one hand at least indirectly at the housing, and on the other hand at least indirectly at the packing element.

6. The tensioning device according to claim 1, wherein the packing element is designed like a sleeve.

7. The tensioning device according to claim 6, wherein the packing element comprises a head essentially closing the sleeve shape, which is at least indirectly pressed against an end wall of the hollow space in the tensioning piston.

8. The tensioning device according to claim 6, wherein the packing element comprises a mandrel-like extension inside, which extends into the interior of the pressure spring for reducing the volume of the pressure space.

9. The tensioning device according to claim 7, wherein the head of the packing element provides, alone and/or in cooperation with the end wall of the hollow space, a fluid communication between the throttle channel and the vent opening.

10. The tensioning device according to claim 2, wherein the throttle channel extends helically between the tensioning piston and the packing element, and/or in the packing element.

11. The tensioning device according to claim 9, wherein the fluid communication comprises a ring channel disposed between the end wall of the hollow space and the head of the packing element, and/or in the packing element.

12. The tensioning device according to claim 11, wherein the vent opening is designed as a central bore arranged in the tensioning piston head, and the fluid communication comprises at least one discharge channel disposed between the end wall of the hollow space and the head of the packing element, and/or in the head of the packing element, the discharge channel connecting the ring channel with the central vent opening.

13. A series of tensioning devices, comprising:
    at least one first and at least one second tensioning device according to claim 1, wherein the first and the second tensioning devices comprise a housing bore for receiving the tensioning piston and a tensioning piston having a standardized diameter of the same size, and wherein the damping means of the at least one first tensioning device differs from the damping means of the at least one second tensioning device in its damping characteristic, wherein the different damping characteristics are obtained by means of packing elements of different dimensions or embodiments.

14. A transmission with a flexible drive means, such as a chain or a belt, of at least two gearwheels in active relation with the drive means, comprising a tensioning device according to claim 1.

15. A series of transmissions, comprising at least one first transmission and at least one second belt wrap transmission, wherein the first transmission comprises a first tensioning device of a series of tensioning devices according to claim 13, and the second transmission comprises a second tensioning device of a series of tensioning devices according to claim 13.

* * * * *